United States Patent
Dunleavy

(10) Patent No.: US 8,205,567 B2
(45) Date of Patent: Jun. 26, 2012

(54) METHOD OF MAKING COMPOSITE MATERIAL STIFFENERS

(75) Inventor: Patrick Dunleavy, Palaiseau (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 345 days.

(21) Appl. No.: 12/531,565

(22) PCT Filed: Mar. 7, 2008

(86) PCT No.: PCT/FR2008/000300
§ 371 (c)(1),
(2), (4) Date: Sep. 16, 2009

(87) PCT Pub. No.: WO2008/132319
PCT Pub. Date: Nov. 6, 2008

(65) Prior Publication Data
US 2010/0096067 A1    Apr. 22, 2010

(30) Foreign Application Priority Data
Mar. 16, 2007   (FR) ..................................... 07 01947

(51) Int. Cl.
*D05B 23/00*    (2006.01)
*B32B 7/08*    (2006.01)

(52) U.S. Cl. ....... 112/475.08; 156/93; 428/85; 428/102; 264/510

(58) Field of Classification Search ............. 112/475.06, 112/475.08, 475.17, 440; 428/102, 85; 156/93; 264/510
See application file for complete search history.

(56) References Cited

U.S. PATENT DOCUMENTS

| | | | | |
|---|---|---|---|---|
| 3,996,084 A | * | 12/1976 | Holmes | 156/93 |
| 4,331,495 A | * | 5/1982 | Lackman et al. | 156/93 |
| 4,410,577 A | * | 10/1983 | Palmer et al. | 428/85 |
| 4,622,254 A | | 11/1986 | Nishimura et al. | |
| 4,966,802 A | | 10/1990 | Hertzberg | |
| 5,429,853 A | * | 7/1995 | Darrieux | 428/102 |
| 5,518,564 A | | 5/1996 | Darrieux | |
| 6,896,841 B2 | * | 5/2005 | Velicki et al. | 264/510 |

FOREIGN PATENT DOCUMENTS

EP    0056352    7/1982
EP    1023986    8/2000

* cited by examiner

*Primary Examiner* — Ismael Izaguirre
(74) *Attorney, Agent, or Firm* — Sughrue Mion, PLLC

(57) ABSTRACT

A method of making at least one stiffener element includes cutting out two substantially identical elongate flanks from fiber plates, each flank presenting two lateral projections on either side of a central portion. The flanks are superimposed with one another and stitched together along two parallel lines that mark the boundaries between the lateral projections and the central portions. The lateral projections are folded along the lines of stitching to either side of the assembly in order to form flanges.

8 Claims, 3 Drawing Sheets

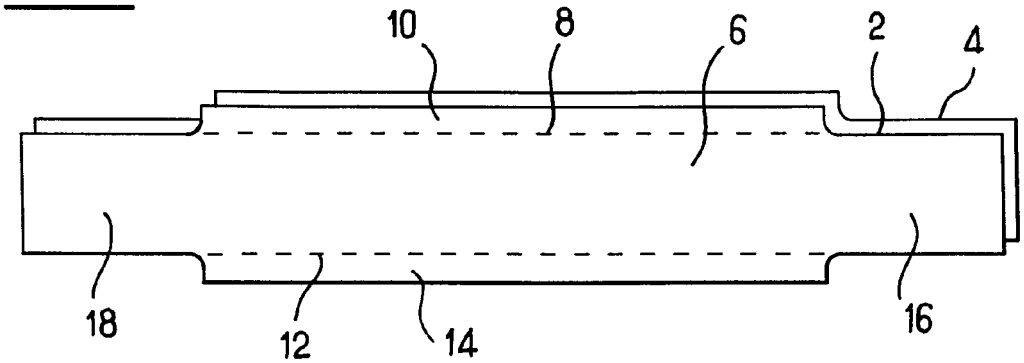
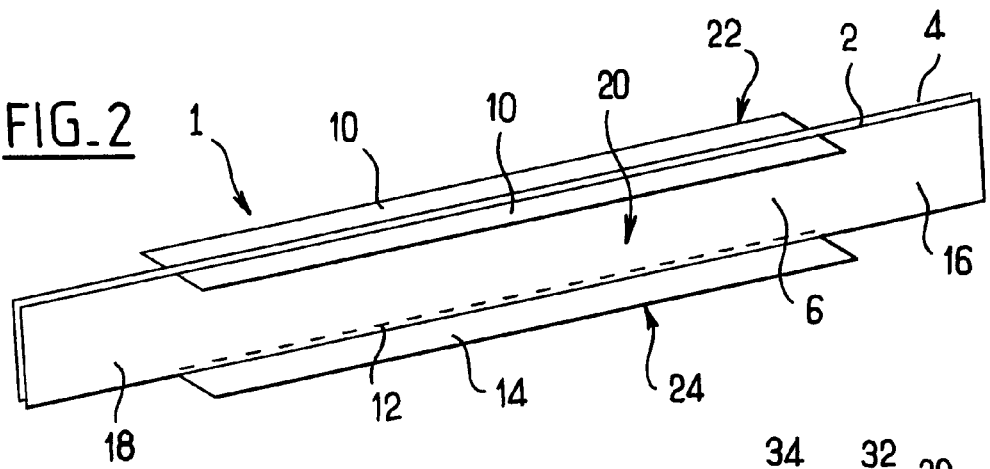
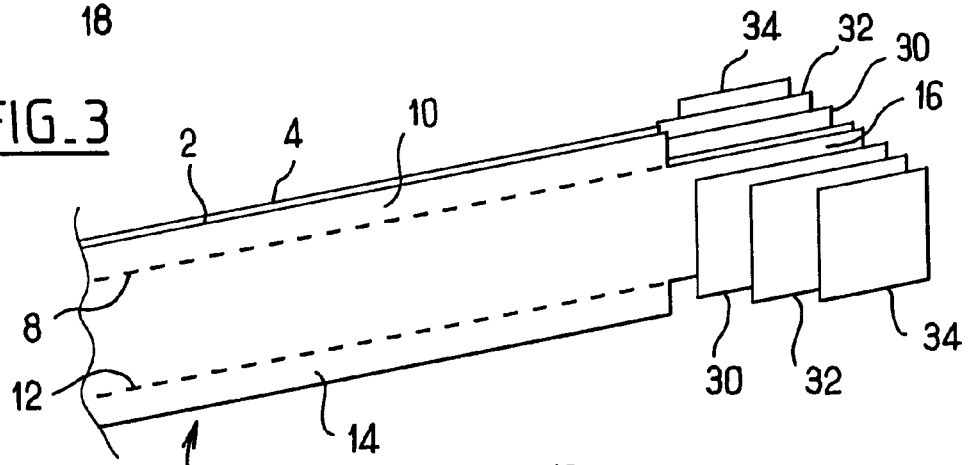
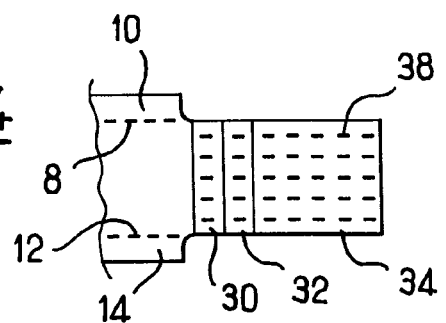

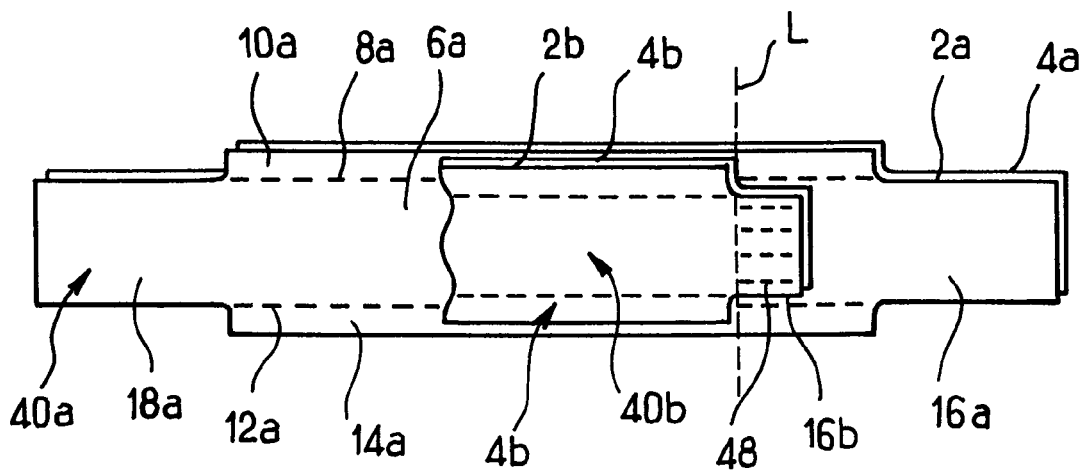
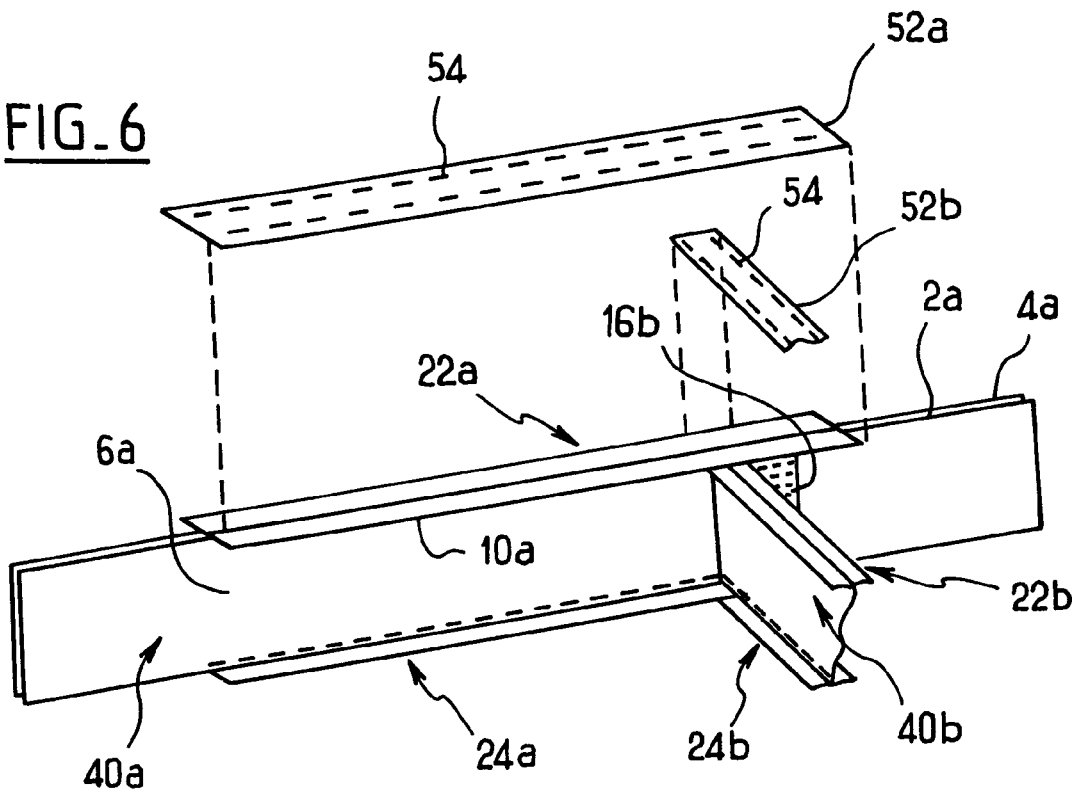

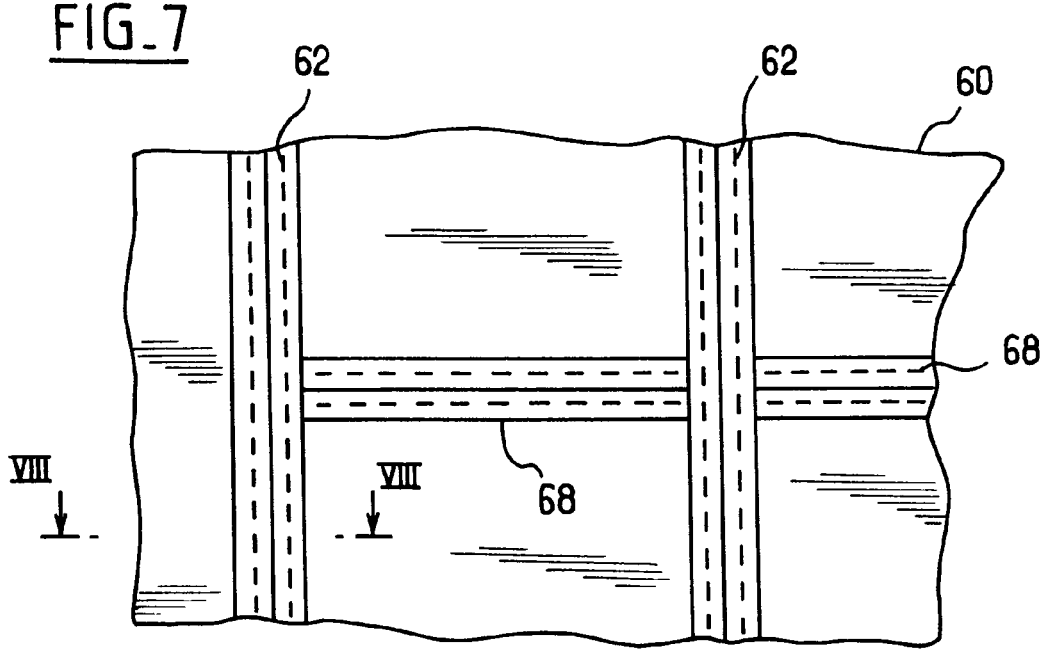
FIG_7
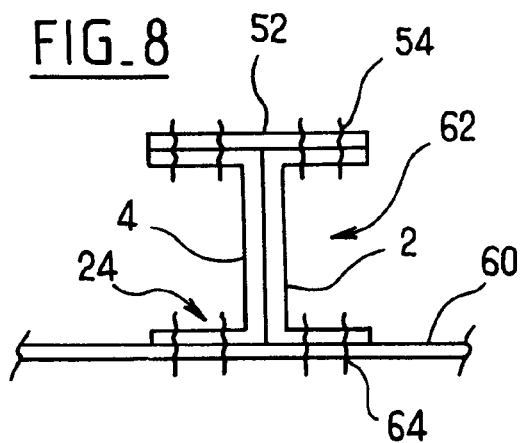
FIG_8
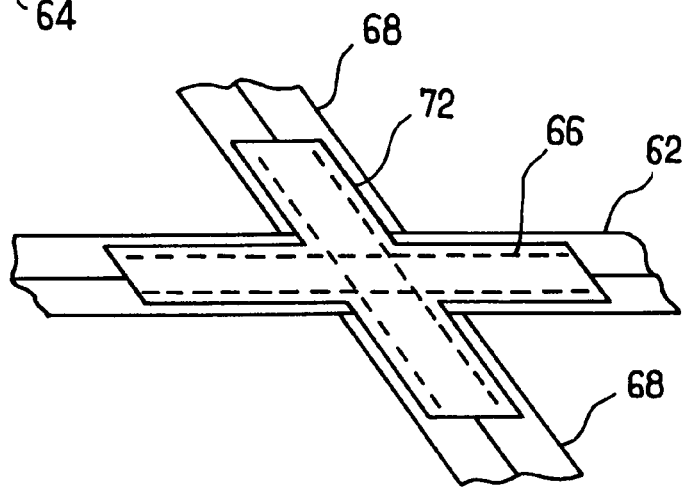
FIG_9

METHOD OF MAKING COMPOSITE MATERIAL STIFFENERS

CROSS-REFERENCE TO RELATED APPLICATIONS

This application is entitled to the benefit of and incorporates by reference essential subject matter disclosed in International Application No. PCT/FR2008/000300 filed on Mar. 7, 2008 and French Patent Application No. 07 01947 filed on Mar. 16, 2007.

FIELD OF THE INVENTION

The present invention relates to stiffener elements made of composite material for stiffening thin structural elements such as panels, in particular for use in aviation.

BACKGROUND OF THE INVENTION

Airplanes or helicopters include thin structural elements of sizes that can be quite large, and that need to withstand various mechanical stresses that may act in various directions, while remaining as lightweight as possible.

It is known to make such thin structural elements from plates made of fibers such as carbon fibers, glass fibers, or aramid fibers. Within the plates, the fibers are assembled together in layers or plies that are assembled to one another, in particular by weaving. The plates thus possess a certain amount of strength that enables them to be cut and handled. Portions cut out from such plates are then assembled together, after which they are impregnated with a polymerizable resin in order to obtain the structural element.

One well-known means for conferring stiffness to thin structural elements while minimizing the weight of said thin elements consists in applying stiffeners thereto.

The prior art is illustrated in particular by the following documents: U.S. Pat. No. 462,254, EP 1 023 986, EP 0 056 352, U.S. Pat. No. 5,518,564, and U.S. Pat. No. 4,966,802.

OBJECT OF THE INVENTION

The invention seeks to provide very simple means for making stiffeners from thin plates similar to those used for making thin structural elements.

BRIEF SUMMARY OF THE INVENTION

To this end, the invention provides a method of making at least one stiffener element, the method comprising the following steps:
   cutting out two substantially identical elongate flanks from fiber plates, each flank presenting two lateral projections on either side of a central portion;
   superposing the flanks and stitching them together along two parallel lines that mark the boundaries between the lateral projections and the central portions; and
   folding the lateral projections along the lines of stitching to either side of the assembly as formed in this way.

The lateral projections as folded out in this way form reinforcing ribs for the stiffener element, which ribs extend in pairs in two parallel planes so as to form flanges on either side of a web of the stiffener element that is constituted by the central portions of the flanks. The lines of stitching thus constitute natural fold lines. These lines of stitching thus extend from the bases of said ribs and constitute the points where the ribs are connected to the stiffener, thereby providing good cohesion and increased ability to withstand damage, together with greater stiffness for the resulting part.

BRIEF DESCRIPTION OF THE DRAWINGS

The invention can be better understood and other characteristics and advantages appear more clearly on reading the following description given by way of example and with reference to the accompanying drawings, in which:

FIG. 1 is a perspective view of two flanks cut out from fiber plates and assembled together by stitching for the purpose of making a stiffener element in a particular implementation of the invention;

FIG. 2 is a perspective view of the two flanks of FIG. 1 after they have been folded;

FIG. 3 is a perspective view of a stiffener element while it is being made in a variant implementation;

FIG. 4 is a fragmentary face view of the FIG. 3 stiffener element;

FIG. 5 is a perspective view of stiffener elements assembled together in a particular implementation of the invention;

FIG. 6 is a perspective view of the FIG. 5 stiffener elements, shown after they have been folded;

FIG. 7 is a face view of a panel provided with an array of stiffeners;

FIG. 8 shows said panel in section on line VIII-VIII of FIG. 7; and

FIG. 9 is a perspective view of reinforcement for assembled-together stiffeners.

DETAILED DESCRIPTION OF THE INVENTION

FIG. 1 shows how a stiffener element is made in the form of an elongate stiffener. Fabrication begins by cutting out two identical flanks 2 and 4 from a fiber plate, the flanks being cut out to be elongate in shape. It is preferable to use plates that are made up by superposing plies that are themselves interconnected by connections suitable for imparting cohesion to the plies so as to facilitate the handling of flanks as cut out in this way, e.g. connections involving inter-ply stitching or weaving. The fibers may be glass fibers, carbon fibers, or indeed aramid fibers.

Each flank 2, 4 has a central portion 6 forming a rectangular strip that extends over the entire length of each flank. The central portion 6 is bordered in part along its long side and in symmetrical manner by two lateral projections 10 and 14 that form rectangular strips of small width. These lateral projections 10 and 14 terminate before the ends of the central portion 6, thereby defining two free ends 16 and 18 of the central portion, which ends are identical in length in this example.

The flanks 2 and 4 are superposed and stitched together by two parallel rectilinear lines of stitching 8 and 12 that extend along the central portion 6 of each flank and that separate the lateral projections 10 and 14 from the central portion.

FIG. 2 shows the flanks 2 and 4 in a following fabrication step. In this step, the lateral projections 10 and 14 are folded at right angles along the lines of stitching 8 and 12 on either side of the central portions 6 such that the lateral portions 10 of the two flanks lie in a common plane, with the lateral projections 14 likewise extending in a common plane. This produces flanges 22 and 24 that are symmetrical in shape about the plane of contact between the two flanks 2 and 4, the flanges 22 and 24 extending on either side of the web of the stiffener constituted by the central portions of the flanks.

The assembly made in this way is then impregnated with resin, e.g. by a well-known transfer method such as injecting resin under pressure or vacuum infiltration. The resin is then hardened, by being polymerized in this example.

The cross-section of the stiffener 1 is generally I-shaped, with the two adjacent central portions 6 of the flanks 2 and 4 forming the web 20 of the stiffener, and the lateral projections 10 and 14 forming the flanges 22 and 24 of the stiffener. This well-known I-section enables stiffeners to be made in the form of beams presenting good strength in the face of various mechanical stresses, in particular good bending strength, while minimizing the amount of material that is used, thereby enabling weight and manufacturing costs to be limited.

It should be observed that the stiffener 1 of the invention possesses good cohesion, since the two symmetrical portions formed by the two flanks 2 and 4 are connected together along their length by the lines of stitching 8 and 12 that contain reinforcing fibers, that are themselves impregnated with resin and that extend in a direction that is perpendicular to the web 20. The type of stitching may be adapted to add a greater or smaller number of fibers in this direction.

Furthermore, the lines of stitching 8 and 12 are made along the edges of the web 20, at the bases of the flanges 22 and 24, where stresses are high, and they occupy two lines that are well spaced apart so as to impart better stiffness to the assembly.

FIGS. 3 and 4 show a variant embodiment of a stiffener while it is being fabricated from two flanks 2 and 4 that are similar to those of FIG. 1 and that are assembled together by two lines of stitching 8 and 12.

Prior to the folding operation, the free ends 16 of each of the flanks 2 and 4, while engaged back-to-back, have their outside faces covered by first, second, and third reinforcing elements 30, 32, and 34 that are likewise cut out from a fiber plate.

The reinforcing elements 30, 32, and 34 are rectangular in shape and three of their sides match the outlines of the ends 16. For the first reinforcing element 30, the fourth side, which is directed towards the central portion of the flanks 2 and 4, terminates substantially level with the ends of the lateral projections 10 and 14. The fourth side of the second reinforcing element 32 and the fourth side of the third reinforcing element 34 are offset successively so as to form a staircase section of thickness that increases towards the ends of the flanks 2 and 4.

The two sets of three reinforcing elements 30, 32, and 34 and the support flanks 2 and 4 are stitched together across their thickness along a plurality of lines of stitching 38 that start from the largest reinforcing elements 30 so as to hold the assembly together while also adding reinforcing fibers in a direction that is perpendicular to the plane. A connection element may be fastened to the end 16 of the stiffener 1, e.g. by piercing the end 16 and fitting a metal connection element in the resulting hole. If a bending moment is exerted by the connection, it is then transferred to the web 20 of the stiffener progressively as a result of the regular variation in the thickness of the reinforcing elements 30, 32, and 34. By way of example, the connection element may be constituted by a hinged end-fitting mounted at the end of the stiffener that is used as a connection arm.

Naturally, the number of reinforcing elements may be modulated as a function of the stiffness that it is desired to obtain. If no fastener element needs to be fitted to the stiffener, it is also possible to omit one or both of the free ends of the stiffener.

FIGS. 5 and 6 show a method of assembly, e.g. for the purpose of forming a stiffener element forming an array. A first stiffener blank 40a is made by the method described above and has two flanks 2a and 4a that are stitched together, and the lateral projections 10a and 14a have not yet been folded out.

A second stiffener blank 40b of substantially identical width is also being made, likewise comprising two stitched-together flanks 2b and 4b. Its lateral projections are likewise not yet folded out.

The two stiffener blanks 40a and 40b are superposed longitudinally and flat one against the other, with their central portions overlapping, at least in part. The free end 16b of the second stiffener blank 40b is placed on the central portion 6a of the first stiffener blank 40a. Lines of stitching 48 are then provided to connect the free end 16b of the second stiffener blank 40b to the central portion 6a of the first stiffener blank 40a. This operation is made easier by the fact that all of the superposed flanks are still flat.

As can be seen in FIG. 6, the second stiffener blank 40 is then folded, in this example at right angles relative to the first stiffener blank 40a along a fold line L marking the boundary between the stitched end 16b and the remainder of the second stiffener 40b. Thereafter the lateral projections 10a, 14a, 10b, and 14b of each stiffener blank are folded out in turn as described above so as to constitute flanges 22a and 22b. This provides a stiffener array constituted by two interconnected stiffeners.

By selecting identical widths for the central portions 6a and 6b of each of the stiffeners 40a and 40b, the flanges 22a and 22b of the two stiffeners lie in common planes. In addition, by folding the second stiffener 40b along the fold line 40, continuity is obtained with the flanges 22a and 22b that extend from one stiffener to the other.

In a particular aspect of the invention, the stiffeners are reinforced by adding reinforcing strips 52a and 52b that are cut out from fiber plates, and that fit on the flanges 22a and 22b of the stiffeners. In the example shown in FIG. 6, a reinforcing strip 52a covers the flange 22a of the first stiffener 40a, while a reinforcing strip 52b covers the flange 22b of the second stiffener 40b. The reinforcing strips are stitched onto the flanges 22a and 22b by lines of stitching 54 that can also be seen in FIG. 8. At this point it should be observed that the reinforcing strips 52a and 52b overlap at the junction between the stiffeners 40a and 40b, thereby contributing to reinforcing this connection.

FIG. 7 shows a plurality of stiffeners 62 and 68 that are assembled using the above-described technique so as to form a stiffener element in the form of a meshed array for stiffening a panel 16 cut out from a fiber plate and shaped, e.g. in a jig or a mold. The stiffener array made in this way is placed on the panel, and the flanges that are in contact with the panel are stitched thereto.

FIG. 8 shows how one of the stiffeners 62 of the stiffener array is assembled on the panel 60. Lines of stitching 64 connect the bottom flange 24 of the stiffener to the panel 60. All of the flanges of all of the stiffeners making up the stiffener array are naturally stitched to the panel 60.

By using the same materials for the panel 60 and the stiffeners 62 and 68, it is ensured that the assembly is thoroughly uniform, with the connections being made using similar materials.

FIG. 9 shows another type of reinforcing strip 72 that is cross-shaped, covering simultaneously the top flange of the first stiffener 62 and the top flanges of two stiffeners 68 in alignment that extend from either side of the first stiffener 62. Lines of stitching 66 then connect together the cross-shaped strip 72 and the flanges of the stiffeners 62 and 68. This reinforcement is particularly suitable for reinforcing crosspoints in the meshed array shown in FIG. 7.

The assembly constituted by the stiffener array and the panel as produced in this way is then impregnated with resin, e.g. by a well-known transfer method, and subsequently polymerized.

This produces a stiffened panel with lines of stitching that greatly improve its ability to accommodate damage. The lines of stitching prevent the stiffeners from breaking up or becoming separated from the panel, e.g. in the event of an impact leading to the resin delaminating at the interface between the panel and the stiffening array.

In general, the lines of stitching may be implemented using various different stitches, in particular using tufting stitching, and the number of lines of stitching may be adapted to achieve particular degrees of reinforcement for the connection. It is preferable to use fibers of the same type as the fibers that make up the flanks and the reinforcing strips.

Furthermore, the orientation of the reinforcing fibers for the stiffeners may be adapted to privilege such or such a stiffening direction as a function of the direction of the stresses to which the stiffener is to be subjected, so as to improve its mechanical strength, in well-known manner.

What is claimed is:

1. A method of making at least one stiffener element, the method comprising the steps of:
    cutting out two substantially identical elongate flanks (2, 4) from fiber plates, each flank presenting two lateral projections (10, 14) on either side of a central portion (6);
    superposing the flanks (2, 4) and stitching them together along two parallel lines (8, 12) that mark the boundaries between the lateral projections and the central portions; and
    folding the lateral projections (10, 14) along the lines of stitching to either side of the assembly as formed in this way in order to form flanges (22, 24),
    wherein the central portions (6) of the flanks extend beyond the lateral projections in order to define at least at one free end (16, 18) of the stiffener element.

2. A method according to claim 1, wherein at least one reinforcing element (30, 32, 34) cut out from a fiber plate is stitched on the free end and is stitched at the free end.

3. A method according to claim 2, wherein a plurality of reinforcing elements (30, 32, 34) are stitched on either side of the free end.

4. A method of making a stiffener element, the method comprising the steps of:
    cutting out two substantially identical elongate flanks (2a, 4a) from fiber plates, each flank presenting two lateral projections (10a, 14a) on either side of a central portion (6a);
    superposing the flanks (2a, 4a) and stitching them together along two parallel lines (8a, 12a) that mark the boundaries between the lateral projections and the central portions in order to obtain a first stiffener blank (40a);
    cutting out two substantially identical elongate flanks (2b, 4b) from fiber plates, each flank presenting two lateral projections (10b, 14b), on either side of a central portion (6b), the flanks presenting at least one free end (16b);
    superposing the flanks (2b, 4b) and stitching them together along two parallel lines (8b, 12b) that mark the boundaries between the lateral projections and the central portions in order to obtain a second stiffener blank (40b);
    superposing the two stiffener blanks so that the free end (16b) of the second stiffener blank (40b) faces the central portion (6a) of the first stiffener blank (40a);
    stitching the free end (16b) of the second stiffener blank to the central portion of the first stiffener blank;
    folding the second stiffener blank (40b) in such a manner that it extends transversely relative to the first stiffener blank; and
    folding the lateral projections (10a, 14a, 10b, 14b) at right angles along the lines of stitching (8a, 12a, 8b, 12b) so that the lateral projections form flanges (22a, 24a, 22b, 24b).

5. A method according to claim 4, wherein reinforcing strips (52a, 52b) cut out from a fiber plate are sewn onto the flanges.

6. A method according to claim 5, wherein the reinforcing strips (52a, 52b) cross at a junction of the stiffener element.

7. A method according to claim 4, wherein a reinforcing cross (72) cut out from a fiber plate is sewn onto the flanges at a junction of the stiffener element.

8. A method of making a stiffened panel, the method comprising the steps of:
    cutting a panel (60) out from a fiber plate;
    making a stiffener element according to claim 1 or according to claim 5; and
    placing the stiffener element on the panel and stitching the flanges of the stiffener element that face the panel thereto.

* * * * *